United States Patent [19]
Bassler et al.

[11] Patent Number: 5,510,039
[45] Date of Patent: Apr. 23, 1996

[54] METHOD FOR SEPARATING OFF SOLID MATERIALS

[75] Inventors: Wolfgang Bassler, Allensbach; Eckhard Gutsmuths, Ravensburg; Hans Kleinschnittger, Weingarten; Wolfgang Mannes, Günzburg-Reisensburg,, Germany

[73] Assignee: Sulzer-Escher Wyss GmbH, Ravensburg, Germany

[21] Appl. No.: 228,334

[22] Filed: Apr. 15, 1994

[30] Foreign Application Priority Data

Apr. 17, 1993 [DE] Germany ............... 43 12 540.9

[51] Int. Cl.⁶ ............................................. C02F 1/24
[52] U.S. Cl. ................... 210/703; 210/707; 210/788; 210/802; 210/221.2; 210/525; 210/928
[58] Field of Search .................... 210/519, 521, 210/703, 704, 707, 788, 789, 787, 802, 800, 221.1, 221.2, 538, 534, 525, 928

[56] References Cited

U.S. PATENT DOCUMENTS

| | | |
|---|---|---|
| 3,557,956 | 1/1971 | Braun . |
| 4,022,696 | 5/1977 | Krofta . |
| 4,157,952 | 6/1979 | Krofta . |
| 4,184,967 | 1/1980 | Krofta . |
| 4,214,982 | 7/1980 | Pfalzer . |
| 4,279,743 | 7/1981 | Miller . |
| 4,399,028 | 8/1983 | Kile . |
| 4,415,452 | 11/1983 | Heil . |
| 4,512,888 | 4/1985 | Flynn . |
| 4,560,474 | 12/1985 | Holik . |
| 4,620,926 | 11/1986 | Linck . |
| 4,816,165 | 3/1989 | Carroll . |
| 4,952,308 | 8/1990 | Chamberlin . |
| 5,176,835 | 1/1993 | Perletti . |
| 5,192,423 | 3/1993 | Duczmal . |
| 5,242,585 | 9/1993 | Krofta . |

FOREIGN PATENT DOCUMENTS

| | | |
|---|---|---|
| 2727398 | 1/1979 | Germany . |
| 2812105 | 9/1979 | Germany . |
| 3529638 | 7/1986 | Germany . |
| 3529638A1 | 7/1986 | Germany . |
| 4108214 | 9/1992 | Germany . |
| 2102308 | 2/1983 | United Kingdom . |
| 2106490 | 4/1983 | United Kingdom . |

OTHER PUBLICATIONS

D. Bradley "The Hydrocyclone" Pergamon Press Ltd. 1965© pp. 119–120.

*Primary Examiner*—Thomas M. Lithgow
*Attorney, Agent, or Firm*—Townsend and Townsend and Crew

[57] ABSTRACT

The method serves for the separation of solid materials out of a suspension and is, as a rule, implemented as a floatation method. The suspension (S) to be clarified is added tangentially from the outside at the periphery of a substantially cylindrical clarification volume (1). Damaging flow phenomena, such as for instance turbulence, are removed to the largest possible extent by flow means (2) which are applied prior to the entry of the suspension into the clarification volume so that an optimal flow takes place in the clarification volume (1). The flow is fed to the center of the clarification volume in a substantially spiral path (4), wherein the scum (6), which receives the materials to be separated out, forms on the surface. Various apparatuses for performing the method are proposed.

13 Claims, 3 Drawing Sheets

METHOD FOR SEPARATING OFF SOLID MATERIALS

BACKGROUND OF THE INVENTION

The invention relates to a method for separating off solid materials from a suspension.

Methods of the named kind are used to separate the largest portion of the solid material particles in a suspension from the suspension. The purpose of doing this can either be for the clarification of contaminated drain water or also for the recovery of solid material particles in a suspension for subsequent use, or for a combination of both these requirements. Floatation is a well suited method in the commonly occurring cases in which the quantity of the suspended solid materials is very low, such as for example approximately 0.1–1%. As is known, a foam or scum (floating sludge) is formed which contains the material to be separated out.

A typical application for the use of a method of this kind is the processing of contaminated waters in a paper factory. These waters often contain a residue of undesired solid material particles which have to be removed in order to better re-employ the water clarified in this way in the paper production. It is methods of this kind which have made it possible that today a considerable part of the water used in a paper factory must no longer be fed into the drain after use, but can be fed back in circulation.

Similar to gravitational sedimentation methods, floatation methods have the property that the suspension which is to be clarified must be subject to treatment for a long time, i.e., a relatively long dwell time is required for carrying out the method. Also as a rule, very large quantities of water must be prepared in this way. For these two reasons, the problem often arises of uniformly conveying large amounts of suspension free from undesired vortices. When this is not achieved, highly damaging short-circuiting currents form which lead to contamination of the water which is already clarified, or at least to an undesired shortening of the dwell time. In the past, highly complicated apparatuses were provided in order to avoid such loss effects. Alongside the disadvantage of the high price of such apparatuses, they also required complicated servicing and were easily contaminated.

SUMMARY OF THE INVENTION

The object of the invention is to provide a method of the named kind which solely requires simple apparatuses for its performance, and wherein additionally these apparatuses require little servicing. Further, the method should allow a separation of the suspended solid material particles which is as efficient as possible.

As a result of the above method, it is possible to introduce the suspension uniformly into the cylindrical clarification volume. By uniformly it is meant that the velocities at the various positions of a flow cross-section are approximately similar directed both in their magnitudes and their direction. After entering into the clarification volume, a spiral flow directed towards the center takes place as a result of the arrangement of inlet and outlet openings. Due to the well controlled inlet flow, the clarification volume itself can be kept free of built-in parts over large areas. Experience has shown that built-in parts of this kind are sensitive to contamination. Since a large rotating spiral flow directed into the center can form in the method of the invention, dead-zones in the flow, vortices, etc. can be reliably avoided. In this manner, the solid materials can rise up to the surface without being diverted by turbulence. The efficiency is thus even better than for known apparatuses.

A further advantage lies in the fact that the the prevention of turbulence improves the effectiveness of the chemicals employed. As is known, the flakes which form from the chemicals and solid materials used in methods of this kind are sensitive to shear forces and damaged by turbulence.

The few remaining built-in parts in the apparatuses for performing the method are mostly very simply formed and can therefore be easily cleaned, whereby as well as cleaning by hand, machine-cleaning is also possible.

As a further effect resulting from performing the method in accordance with the invention, the rotational speed and direction of the sludge outlet device can be selected completely independently. In many known solutions, this sludge outlet device is connected to a rotating suspension feed device for design reasons. Consequently, one of these parameters is no longer freely selectable.

The freely selectable rotational speed of the sludge outlet device in accordance with the invention facilitates the optimization of the sludge removal and increases its operational reliability.

BRIEF DESCRIPTION OF THE DRAWINGS

The invention is described in the following by way of example only and with the aid of drawings which show.

DESCRIPTION OF THE PREFERRED EMBODIMENT

Figure 1:
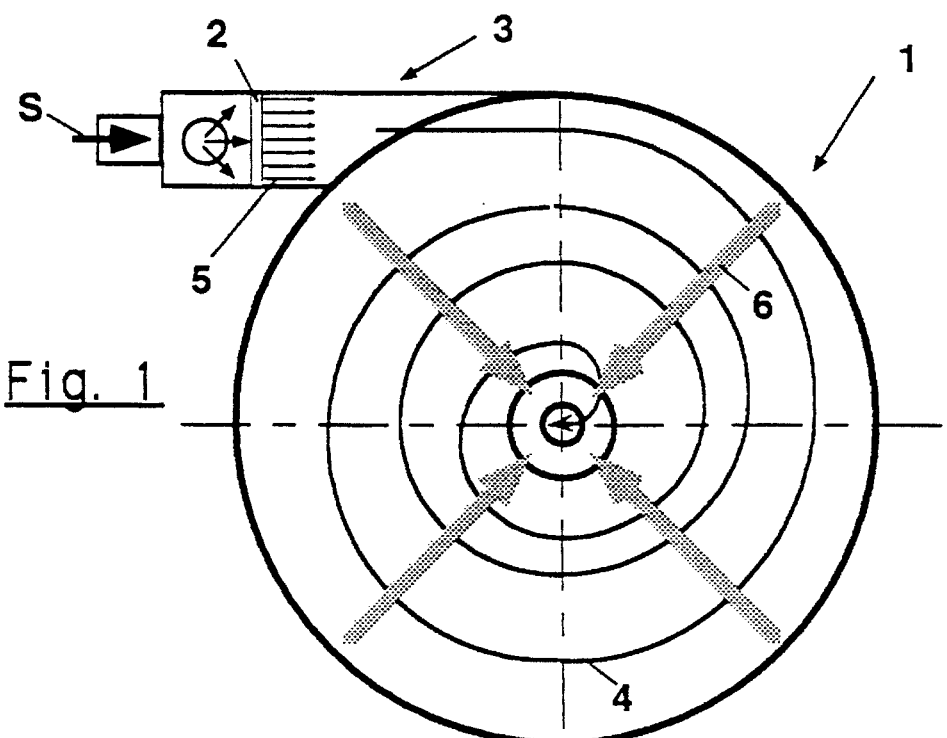
FIGS. 1 to 3 schematically illustrate important method steps according to the present invention.
Figure 3:
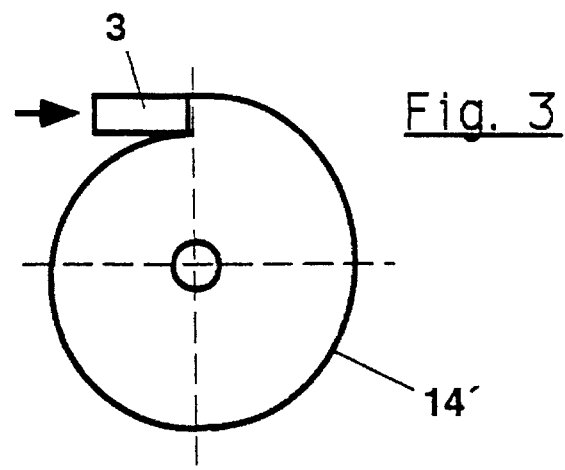

The most important principles of the method in accordance with the invention are schematically illustrated in FIG. 1. One can see that the suspension S is introduced tangentially into a cylindrical clarification volume 1 via a chamber 3. Flow means 2 ensure that the flow is introduced substantially unidirectionally into the clarification volume 1. The flow then reaches the center of the clarification volume via a spiral path 4. The floatation foam which forms collects at the surface and, as indicated schematically by the four arrows 6, moves to the sludge outlet, which is drawn here in the central region of the clarification volume. The clarification volume 1 does not necessarily have to be circular, it can for instance be matched to the flow with a spiralling shape. (See FIG. 3).

Figure 2:
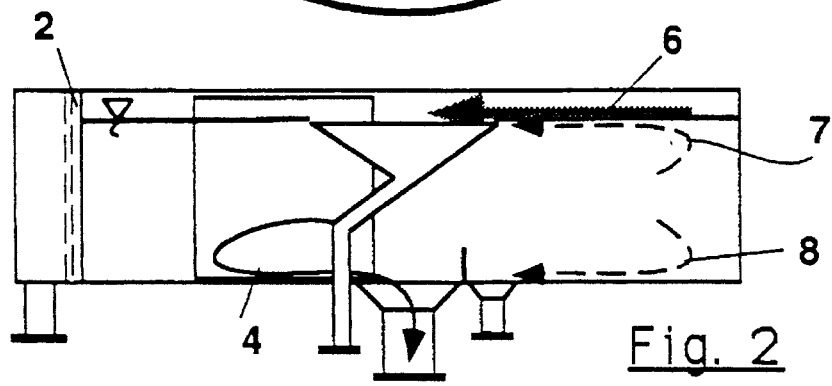

FIG. 2 shows in side view processes which occur during performance of the method. Vortex currents are additionally indicated here with arrows 7 and 8. They can facilitate the sludge transport to the surface and the gravitational sludge transport to the base of the clarification volume respectively. As described later, sludge removal parts can even be dispensed with in particular cases.

Figure 4:
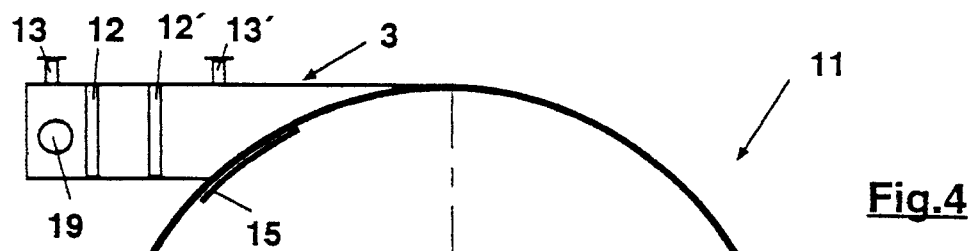
FIG. 4 schematically illustrate a floatation apparatus in plan view.

FIG. 4 shows the plan view of a floatation apparatus for performing the method. It comprises a floatation container 11, the lateral wall 14 of which having the form of a circular cylinder. The chamber 3 receives the suspension flowing through the suspension inlet 19 and guides it into the floatation container. In this case, two flow directors 12 and 12' are mounted in the chamber 3.

In the liquid entering at the suspension inlet 19, the air for the floatation may be present in fine bubbles via relaxation of the suspension. It is also possible to feed in air, or water charged with air, via further supply connections 13, 13', 13", 13'". The connections 13, 13', 13", 13'" can also serve for the addition of chemicals The chamber 3 is connected to the floatation container 11 in such a manner that the lateral wall 14 is interrupted at this position to introduce of the suspension. For adjustment purposes, a sheet metal cover is conceivable at this position which for instance is movable on the cylindrical wall 14 in the circumferential direction and can alter the transitional cross-section between chamber 3 and floatation container 11. A scum collection device 16 serves for feeding out the foam or scum formed by the floatation on the surface and for conveying it towards the scum funnel 17. The transportation of the floatation foam can be achieved particularly well when the scum collection device 16 is moveable in the peripheral direction around the middle of the floatation container. The device is thus supported centrally as well as on the lateral wall of the floatation container. The rotational movement takes place via the drive 18. For the method of sludge removal towards the middle of the floatation container as illustrated here, a transportation apparatus is normally provided in the scum collection device 16 (not shown) which conveys the collected sludge horizontally radially inwards.

Figure 5:
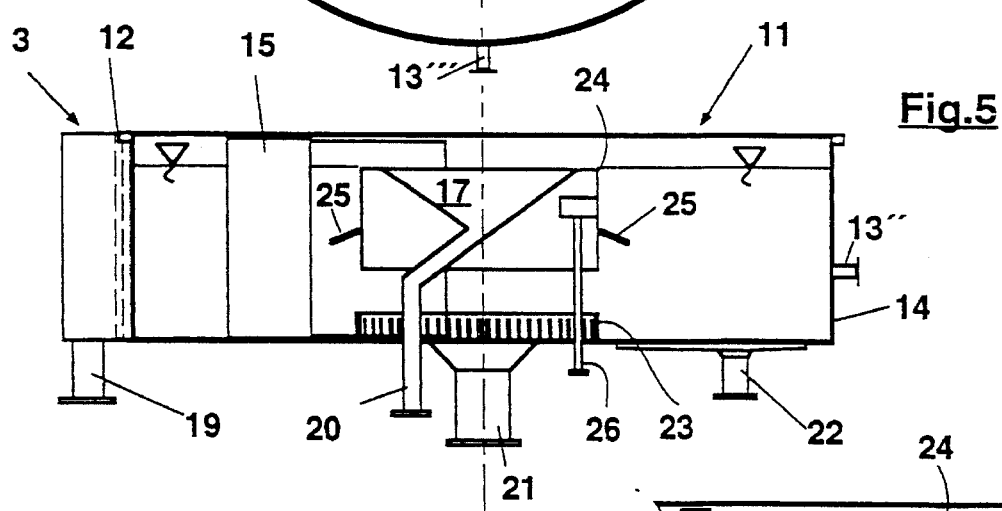
FIG. 5 schematically illustrate a floatation apparatus in side view, sectioned.

FIG. 5 shows a section through the floatation apparatus of FIG. 4 with omission of the scum collection device. At the left hand edge, a part of the chamber 3 with the suspension inlet 19 from below is visible. A flow director 12 is also indicated. The scum formed at the surface and transported to the middle can be drawn off via the scum funnel 17, wherein the scum outlet tube 20 is somewhat eccentrically positioned so that the outlet 21 for the clarified or cleaned water is located centrally in the base of the floatation container 11. Further, the heavy particle and (sinking) sludge outlet 22 is visible.

A a weir 24 will be present in connection with the scum funnel 17, with this weir defining the border between suspension and foam or sludge. Moreover, a cover 25 which extends over the circumference, or a part of the circumference, can be secured to the scum funnel 17 below the water level, thereby preventing in the region of the weir the rising of water which has already been clarified or the sinking of sludge into the clarified water area.

It is furthermore possible to feed off clarified water of a different quality than that carried out by the removal tube 21 via an additional water removal tube 26.

To improve the efficiency of the floatation apparatus further possibilities are described although they are not absolutely necessary. A sieve sheet 23, which is in this case laid in a ring around the clarified water outlet 21, can improve the uniformity of removal of the clarified water in some cases. This sieve sheet can be limited to a part of the suspension height, or border the entire removal volume for clarified water. It does not need to have round openings, it can, as shown here, be provided with slits, preferentially upright slits.

Figure 6:
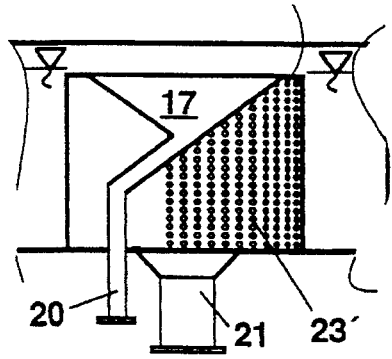
FIG. 6 schematically illustrate variation of the water outlet region.

FIG. 6 shows a part of a circular cylindrical sieve sheet 23' which extends over the full height of the standing water. The openings can be holes or slits or a combination of both. They can also form openings which are zonally different as viewed in the peripheral direction, for instance they can be closed at the inlet of the chamber 3 to prevent an undesired escape of water at this position.

Figure 7:
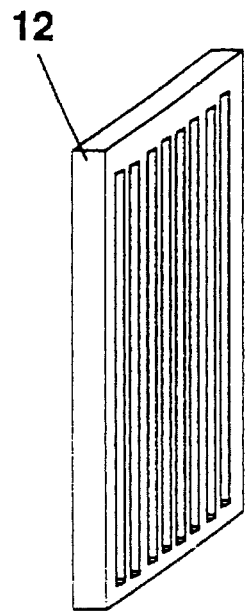
FIG. 7 is a perspective view of a flow director.

FIG. 7 shows a perspective sketch of a possible flow director 12. The flow can form uniformly over the full height and breadth of the chamber through a number of upright slits.

Figure 9:
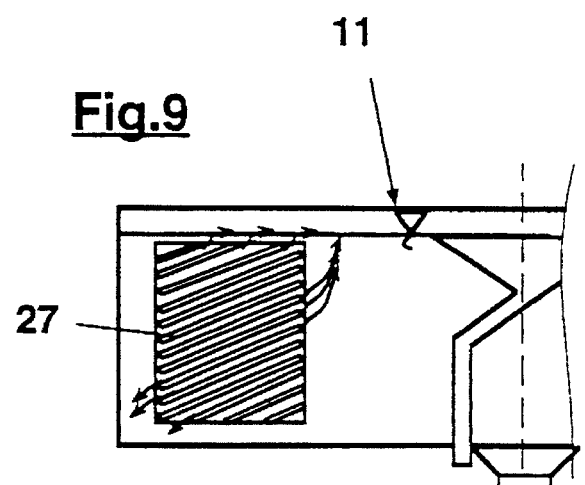
FIG. 9 is a sectional view of the lamella module of FIG. 8.
Figure 8:
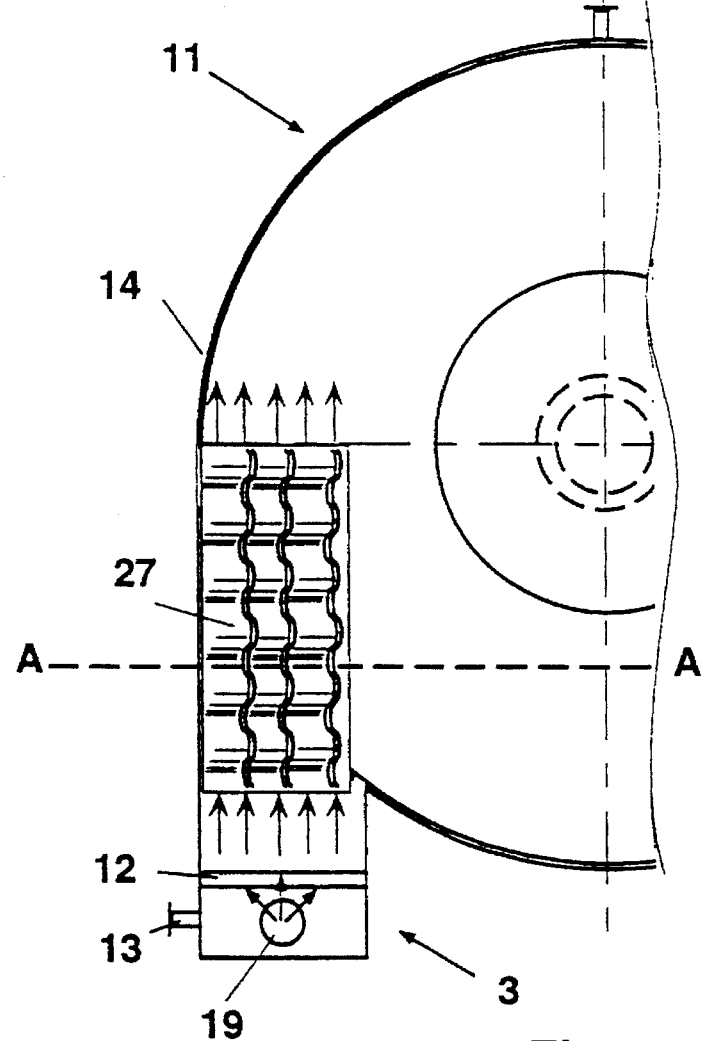
FIG. 8 schematically illustrate part of a floatation device comprising a lamella module.

The lamella module shown in FIG. 8 comprises a plurality of metal sheets 27 which are waved and inclined transverse to the flow direction and which extend substantially over the flow cross-section at the transition from chamber 3 and clarification volume 1. FIG. 9 shows a section through the lamella module made up of the metal sheets 27 through a line A...A. In particular cases, the removal of non-sticking, mostly inorganic solid materials can be further improved by allowing the material which is to be separated out, already after a small rising and sinking movement, to concentrate in the connection at the inlet channel 3 between wave-shaped metal sheets 27. A multiplicity of channels thus form in which the sludges can flow transversely up and down respectively as a result of the transverse inclination of the channels (FIG. 9: exemplary arrows upwards and downwards respectively) and the partially clarified water continues in the main flow. It is however a precondition that the materials do not tend to stick or clog. The representations in the figures are only sketches, optimization of the flow can lead to materially very different solutions depending on the requirements made of this module.

We claim:

1. A method for separating solid materials from a suspension comprising the steps of:

providing a clarification tank having a substantially circular, flat base area and a substantially circular cross-section with a periphery and a center, the tank having an inlet at the periphery and an outlet at the center;

directing the suspension through a chamber such that he suspension flows through an outlet of the chamber in communication with the tank inlet;

tangentially introducing the suspension into the inlet of the clarification tank at the periphery of said tank;

subjecting the suspension to a flotation step wherein bubbles are present to cause the solid materials to float to the surface and form a scum thereon; and directing the suspension into the outlet at the center of the tank along a substantially spiral path such that the suspension is accelerated along the spiral path;

transporting, at selected intervals, the scum formed on the surface to a middle portion of the clarification tank and discharging the scum from the tank; and supplying pressurized air to the suspension and releasing the air into small air bubbles by relaxation before the suspension enters the clarification tank.

2. The method of claim 1 wherein the clarification tank has a base area with a substantially spiral outer wall.

3. The method of claim 1 wherein the chamber has a flow cross-section, the method further including the step of controlling the flow of the suspension through the chamber such that the suspension has a substantially uniform velocity with respect to direction over the entire flow cross-section of the chamber.

4. The method of claim 1 wherein the chamber has a flow cross-section, the method further including the step of controlling the flow of the suspension through the chamber such that the suspension has a substantially uniform velocity with respect to magnitude over the entire flow cross-section of the chamber.

5. The method of claim 1 wherein the suspension is tangentially introduced into the clarification tank at about 0.1 to 0.5 m/s.

6. The method of claim 1 wherein the suspension is accelerated by about 0.1 to 2 mm/s$^2$ along the substantially spiral path.

7. The method of claim 1 wherein the transporting step is carried out with a sludge removal element extending radially across the clarification tank, the sludge removal element being movable in a circumferential direction with respect to said tank.

8. The method of claim 1 further comprising the step of introducing chemicals into the suspension to facilitate flotation of the solid materials in the clarification tank.

9. The method of claim 1 further comprising the step of separating the suspension into different portions, each portion having a different quality.

10. The method of claim 1 further comprising collecting sunken solid materials near a bottom of the tank and discharging said sunken solid materials from the tank.

11. The method of claim 1 further comprising generating a vortex flow near the center of the clarification tank to direct the solid particles toward the center of said tank.

12. The method of claim 11 wherein the vortex flow is generating by a pressure gradient across the tank.

13. A method for separating solid materials from a suspension comprising the steps of:

providing a clarification tank having a substantially circular, flat base area and a substantially circular cross-section with a periphery and a center, the tank having an inlet at the periphery and an outlet at the center;

tangentially introducing the suspension into the inlet of the clarification tank at the periphery of said tank;

subjecting the suspension to a flotation step wherein bubbles are present to cause the solid materials to float to the surface and form a scum thereon;

directing the suspension into the outlet at the center of the tank; and allowing the suspension to naturally flow along a substantially spiral path from the tank inlet to the tank outlet so that the suspension accelerates along said spiral path;

transporting, at selected intervals, the scum formed on the surface to a middle portion of the clarification tank and discharging the scum from the tank; and supplying pressurized air to the suspension and releasing the air into small air bubbles by relaxation before the suspension enters the clarification tank.

\* \* \* \* \*